Aug. 16, 1938.  C. H. BOCK  2,126,984
BRAKE FOR MOTOR VEHICLES
Filed Nov. 29, 1935  2 Sheets-Sheet 2
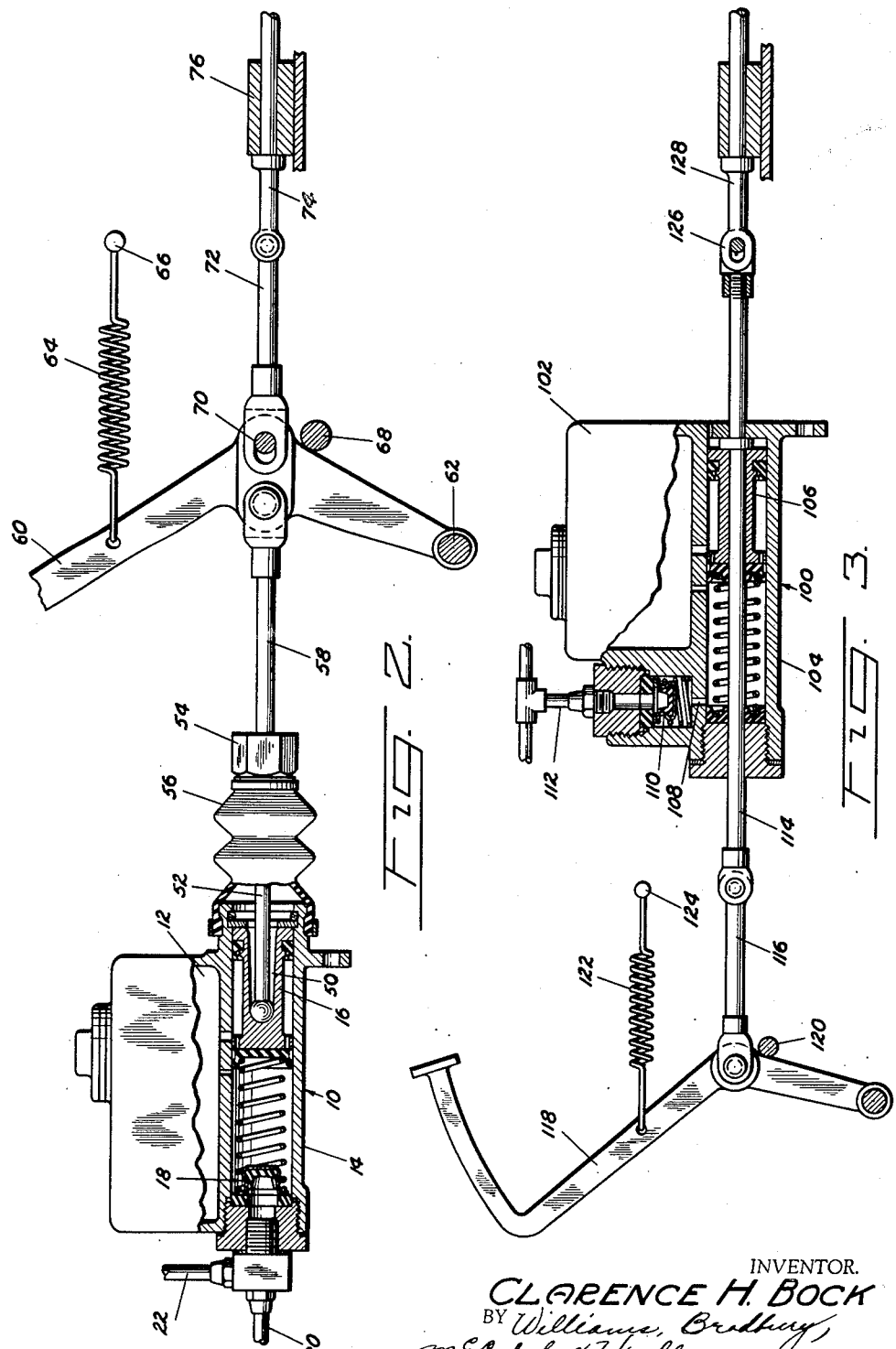
INVENTOR.
CLARENCE H. BOCK
BY Williams, Bradbury,
McCaleb & Hinkle.
ATTORNEYS.

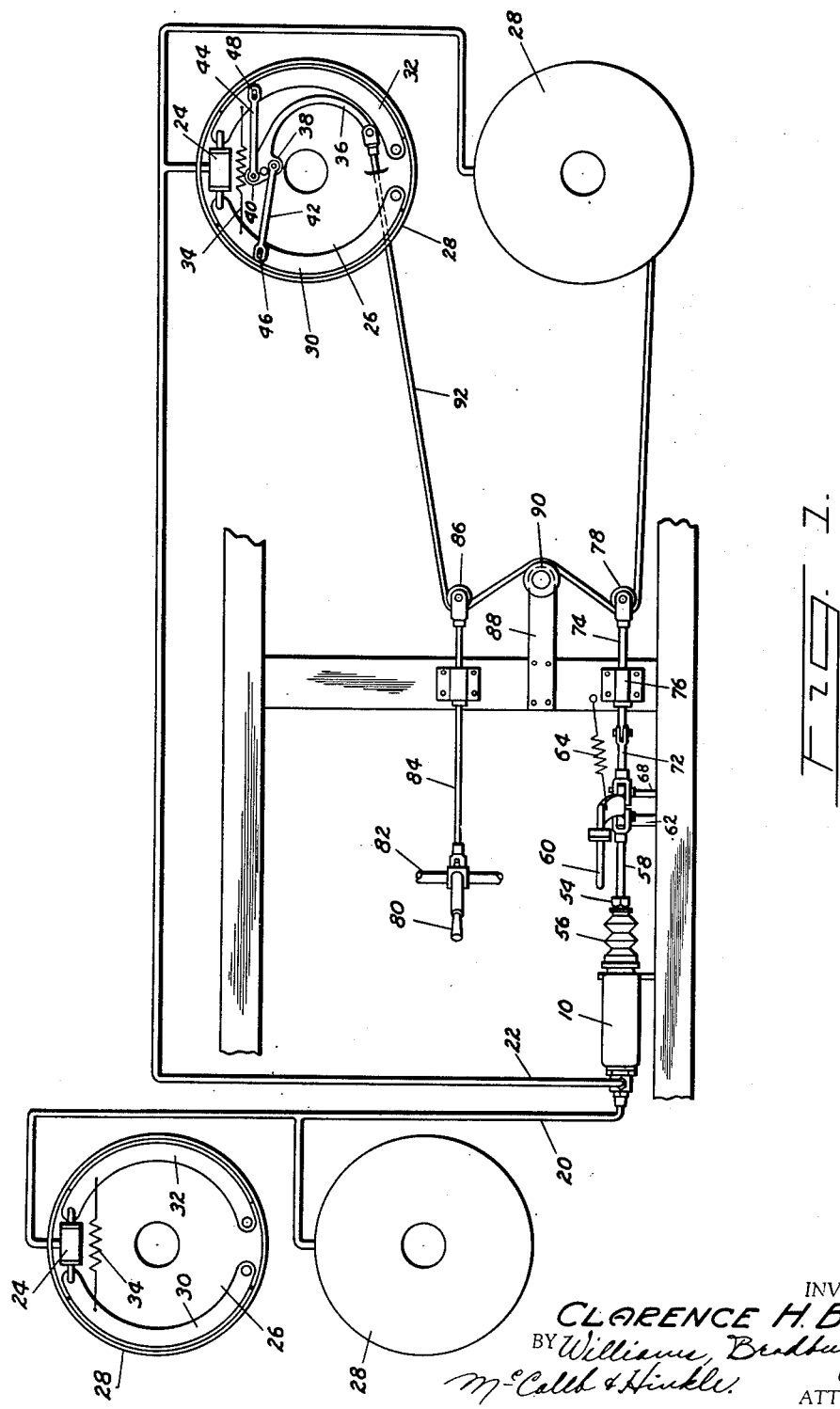

Patented Aug. 16, 1938

2,126,984

UNITED STATES PATENT OFFICE 2,126,984

BRAKE FOR MOTOR VEHICLES

Clarence H. Bock, Detroit, Mich., assignor to Hydraulic Brake Company, Detroit, Mich., a corporation of California Application November 29, 1935, Serial No. 52,003

4 Claims. (Cl. 188—106)

This invention relates to brakes for motor vehicles.

Broadly the invention comprehends an efficient emergency or parking brake for use in connection with fluid pressure actuated brakes of a type now in general use on motor vehicles. Motor vehicles provided with fluid pressure actuated service brakes are generally provided with a mechanically actuated emergency or parking brake, and in many instances the emergency or parking brake mechanism actuates the same brake shoes that form part of the service brake mechanism. The present invention relates more especially to the latter type.

An object of the invention is to provide an efficient fluid pressure system for actuating the shoes of brake structures coupled with mechanical mechanism for actuating the same shoes.

Another object of the invention is to provide a fluid pressure system for the actuation of the shoes of brakes associated with the wheels of motor vehicles and to couple therewith mechanical means for actuating the same shoes so that in case of failure of the fluid pressure system the brakes are maintained effective.

Another object of the invention is to so couple a fluid pressure actuated brake system and mechanically actuated brake system that in case of failure of the fluid pressure brake system, the mechanical brake system is brought into action without loss of pedal travel.

A further object of the invention is to provide a fluid pressure system for actuating the brakes of a motor vehicle coupled with a mechanical brake system for actuating the same brakes, both systems being operable by a single foot pedal lever, and means for separately operating the mechanical system.

Other objects of the invention will appear from the following description taken in connection with the drawings which form a part of this specification, and in which—

Fig. 1 is a schematic view of a brake system embodying the invention;

Fig. 2 is a fragmentary view, partly in section, illustrating the fluid pressure producing device, the operating lever therefor, and linkage for operating the emergency brake; and Fig. 3 is a modified form of the invention.

Referring to the drawings for more specific details of the invention, 10 represents generally a fluid pressure producing device including a reservoir 12, a cylinder 14 supplied therefrom and a piston 16 reciprocable in the cylinder. The cylinder has a discharge port controlled by a two-way valve 18, connected by fluid pressure delivery pipes or conduits 20 and 22 to fluid pressure actuated motors 24 for the actuation of the brakes of a motor vehicle. The conduit 20 is connected to one pair of motors 24 for the actuation of the brakes associated with the front wheels of the vehicle, and the conduit 22 is connected to another pair of motors 24 for the actuation of the brakes associated with the rear wheels of the vehicle.

Each of the brakes may be of any conventional type including a fixed support or backing plate 26, a rotatable drum 28 associated therewith, corresponding friction elements or shoes 30 and 32 pivoted on the backing plate, and a motor corresponding to the motors 24 arranged on the backing plate between the separable ends of the shoes and operative to spread the shoes into engagement with the drum 28 against the resistance of a retractile spring 34 connecting the shoes.

The brakes associated with the rear wheels of the vehicle are like in structure to those associated with the front wheels of the vehicle, with the added feature of an auxiliary or emergency actuated means. This auxiliary or emergency actuated means includes a lever 36 pivoted to the backing plate 26. The lever has diametrically disposed lugs 38 and 40 connected respectively by links 42 and 44 to the shoes 30 and 32 with lost motion connections 46 and 48 between the links and the shoes so that the shoes may be moved into engagement by the motors 24 without in any way effecting the auxiliary or emergency actuated means.

The piston 16 has a recess 50 in its back for the reception of one end of a thrust pin 52, the other end of which is connected to a coupling 54, and a flexible boot 56 is connected between the coupling and the open end of the cylinder for the exclusion of dust and other foreign substances from the cylinder.

The coupling 54 is connected by a rod 58 to a foot pedal lever 60 pivoted on a fixed support 62, and a retractile spring 64 connected between the lever and the fixed support serves to return the lever to its retracted position against a stop 68. The foot pedal lever 60 is connected through a lost motion connection 70 to a rod 72, and this rod is connected in turn to a rod 74 mounted for reciprocation as at 76 and having attached thereto a sheave 78, the object of which will hereinafter appear.

An emergency brake lever 80 fulcrumed on a cross shaft lever 82 is connected to one end of a reciprocal rod 84, the other end of which has attached thereto a sheave 86, and arranged on a fixed support 88 between the respective rods 64 and 84 is a sheave 90. A cable 92 received by the sheaves 78, 86 and 90 has its respective ends attached to the levers 36.

In operation, assuming that the fluid pressure system is filled with suitable fluid and that the piston 16 is in fully retracted position, upon depressing the foot pedal lever 60 force is transmitted from this lever to the piston 16 to move the piston on its compression stroke. As the piston moves on its compression stroke, fluid is displaced from the cylinder 14, through the fluid pressure delivery pipes 20 and 22 to the fluid pressure actuated motors 24, resulting in actuation of these motors and the consequent spreading of the shoes into engagement with the drum against the resistance of the retractile spring 34.

During this operation the foot pedal lever 60 has traveled sufficiently to fully take up the lost motion connection 70 between the foot pedal lever and the reciprocal rod 74 and to have actuated the emergency applying means sufficiently to take up the lost motion connections 46 and 48 between the links 42 and 44 and shoes 30 and 32. Under these conditions, should the fluid pressure system fail, due to leakage in the system or breakage of any of the parts thereof, the auxiliary or emergency operating means immediately comes into action with a minimum loss of pedal travel to maintain the brakes effective.

Upon release of the applied force on the foot pedal lever 60, this lever is returned under the influence of retractile springs 64 to its normal or retracted position against the stop 68; and as the foot pedal lever returns to its retracted position the piston 16 also returns to its retracted position under the influence of a spring interposed between the piston and the head of the cylinder augmented by pressure imposed on the fluid returning from the motors 24 to the cylinder 14. This pressure on the fluid is due to the action of the retractile springs 34 connecting the shoes 30 and 32 of the respective brake structures. Simultaneously with this operation, the reciprocal rod 74 is moved to its retracted position with the result that pull on the cable 92 is released, and the operating levers 36 return to their normal positions assisted by the retractile springs 34.

When it is desired to apply the emergency brake, as, for example, when parking the vehicle, the emergency brake lever 80 is operated in the conventional manner, and force is transmitted therefrom through the rod 84 and sheave 86 to the cable 90 with the result that the levers 36 and the links 42 and 44 are actuated to move the shoes 30 and 32 into engagement with the drum 28. Upon release of the emergency brake lever and the return of this lever to its normal position, pull on the cable is released. This results in the return of the levers 36 and links 42 and 44 to their normal positions with the resultant movement of the shoes 30 and 32 to off position under the influence of retractile springs 34.

A modification of the invention is illustrated in Fig. 3. In this modification the fluid pressure producing device indicated generally at 100 includes a reservoir 102 of any conventional type, a cylinder 104 supplied therefrom, and a piston 106 reciprocable in the cylinder. The cylinder has a discharge port 108 controlled as by a two-way valve 110 and connected by a fluid pressure delivery pipe 112 to fluid pressure actuated motors arranged for the actuation of brakes corresponding in structure to those disclosed in the preferred embodiment of the invention.

A reciprocal rod 114 extends coaxially through the cylinder and piston and is operative to move the piston on its compression stroke. One end of this rod is connected by a link 116 to a foot pedal lever 118 normally held against a stop 120 by a retractile spring 122 connected between the foot pedal lever 118 and a fixed support 124, and the other end of the rod is connected by a lost motion connection 126 to a reciprocal rod 128 corresponding to the reciprocal rod 74 in the preferred embodiment of the invention. The mode of operation of this modification of the invention is substantially identical with that of the preferred structure, the only difference being the type of fluid pressure producing device employed.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. In a vehicle braking system of the class described, the combination of a rotatable drum, a braking element for co-operation therewith, a fluid motor for applying said braking element, mechanical means for applying said braking element, cable means operatively connected to said mechanical means, a hydraulic compressor spaced from said cable means, a brake-actuating pedal for operating said element through said fluid compressor or said cable means, a link extending forwardly from said pedal to said compressor, linkage extending backwardly from said pedal to said cable means, said linkage including a lost-motion connection whereby operation of said pedal normally operates said element hydraulically, and a hydraulic connection between said compressor and said motor.

2. In a vehicle braking system of the class described, the combination of a rotatable drum, a braking element for co-operation therewith, a fluid motor for applying said braking element, a mechanical member for applying said braking element, an abutting connection between said member and element permitting movement of the latter without movement of the former, cable means operatively connected to said mechanical member, a hydraulic compressor spaced from said cable means, a brake-actuating pedal for operating said element through said fluid compressor or said cable means, a link extending forwardly from said pedal to said compressor, linkage extending backwardly from said pedal to said cable means, said linkage including a lost-motion connection whereby operation of said pedal normally operates said element hydraulically, and a hydraulic connection between said compressor and said motor.

3. In a vehicle braking system of the class described, the combination of a pair of rotatable drums, a pair of braking elements for co-operation with each drum, a fluid motor for applying each pair of braking elements, a lever for applying each pair of braking elements, a thrust rod connecting said lever with one of said elements and permitting independent movement of said element by said motor, cable means operatively connected to said lever, a hydraulic compressor spaced from said cable means, a brake-actuating pedal for operating said element through said fluid compressor or said cable means, a link extending forwardly from said pedal to said compressor, linkage extending backwardly from said pedal to said cable means, said linkage including a lost-motion connection whereby operation of said pedal normally operates said element hydraulically, and a hydraulic connection between said compressor and said motor.

4. In a vehicle braking system of the class described, the combination of a pair of rotatable drums, a braking element for co-operation with each drum, fluid motors for applying said braking elements, mechanical means for applying each braking element, a cable for operating said mechanical means and having an end connected to each of said means, a hydraulic compressor spaced from said cable, a pedal for operating said elements through said fluid compressor or said cable, a pivot for said pedal, a link extending forwardly from said pedal to said compressor, linkage extending backwardly from said pedal to said cable, said linkage including a lost-motion connection whereby operation of said pedal normally operates said elements hydraulically, said link and linkage being connected to said pedal on the same side of said pivot, and a hydraulic connection between said compressor and said motors.

CLARENCE H. BOCK.